Patented July 12, 1949

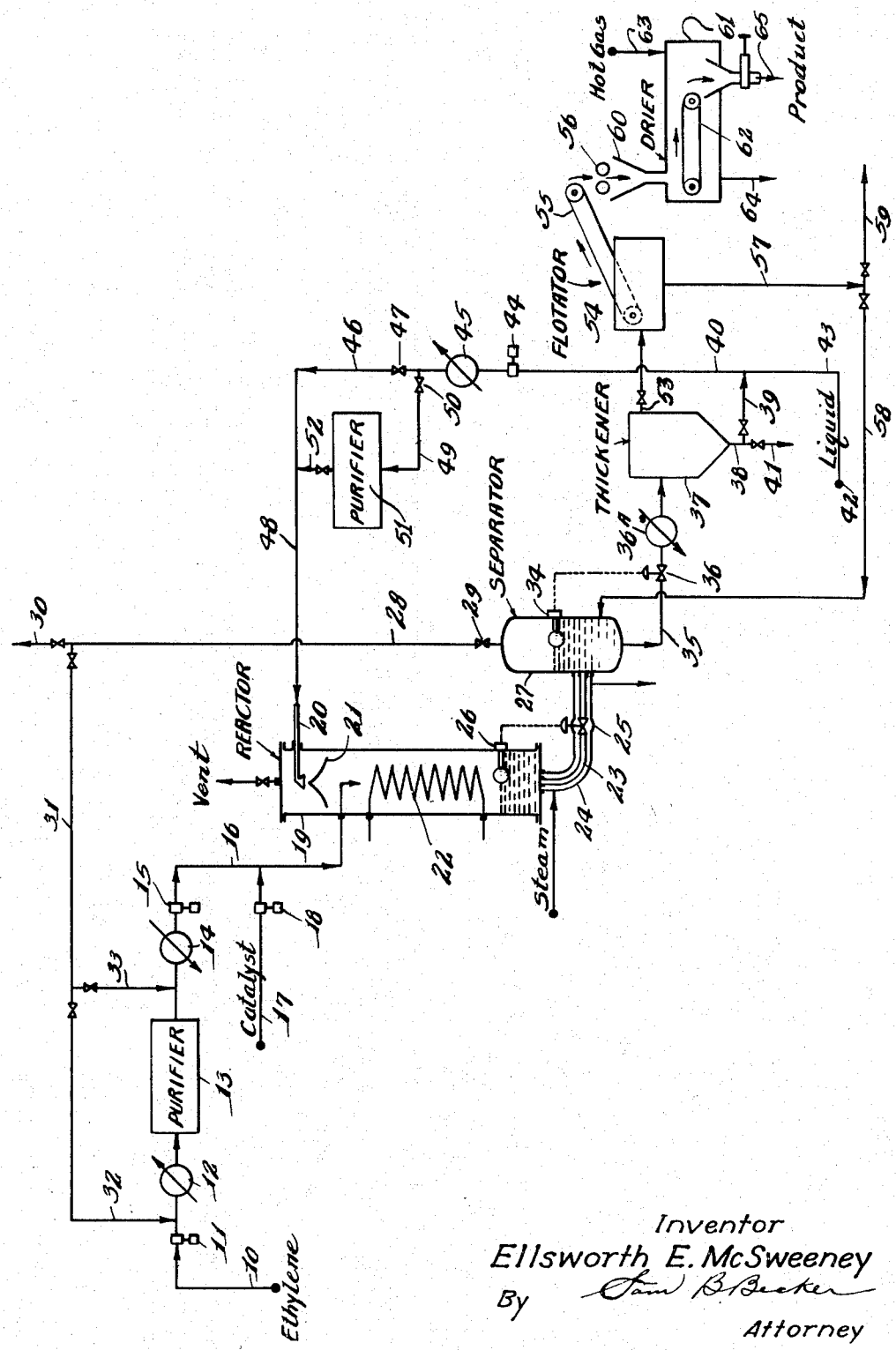

2,475,628

UNITED STATES PATENT OFFICE 2,475,628

ETHYLENE POLYMERIZATION PROCESS

Ellsworth E. McSweeney, Grandview Heights, Ohio, assignor, by mesne assignments, to Standard Oil Company, Chicago, Ill., a corporation of Indiana Application December 31, 1946, Serial No. 719,593

10 Claims. (Cl. 260—94.9)

This invention relates to a process for the continuous polymerization of ethylene to form normally solid polymers. More particularly, it relates to a process and apparatus for the continuous production of tough ethylene polymers having softening temperatures above about 100° C.

It has been proposed to polymerize emulsions of ethylene in aqueous liquids to produce normally solid ethylene polymers. However, it is extremely difficult to secure emulsions having desirably high ethylene concentrations. Moreover, ethylene emulsions in aqueous liquids are inherently unstable and very considerable agitation is required to maintain ethylene emulsions even under high ethylene pressures. In addition, some of the catalysts for the polymerization of ethylene are insoluble or sparingly soluble in water, which gives rise to the problem of adequately contacting the ethylene contained in an aqueous emulsion with the catalyst in a uniform and rapid manner.

It has also been proposed to polymerize ethylene in solution in various solvents, as in U. S. Patent 2,334,195. Here, as in emulsion polymerization, it is difficult to procure ethylene solutions containing a desirably high concentration of ethylene. Also, when ethylene is polymerized in solution, the rate of ethylene polymerization is relatively unaffected by the pressure under which polymerization is conducted; this is extremely disadvantageous and indicates rather strongly that the limiting factor in the rate of ethylene polymerization in solution is the relatively slow rate of dissolution of ethylene in the solvent.

This invention relates to a novel process whereby ethylene is polymerized in the gaseous state under the influence of a homogeneous gas phase catalyst to form normally solid polymers, the polymerization being conducted at a temperature below the softening temperature of the ethylene polymer being produced. It has been found that temperatures below the softening point of the polymer produce good yields of polymer and little or no polymer degradation is encountered at polymerization temperatures below the softening temperatures of polyethylenes, which usually fall between about 100° C. and about 125° C., although polyethylenes of considerably higher or lower softening temperatures can be produced.

Although the polymerization of ethylene in the gaseous state presents many advantages over ethylene polymerization from solutions or emulsions it is attended by a disadvantage which, if not overcome, practically prevents continuous operation. The gaseous phase ethylene polymerization process produces a polymer which forms a coating extending from the confining surfaces of the reaction zone toward the remaining gas phase; the effective volume of the polymerization reactor is progressively reduced over a relatively short period of time to such an extent that it becomes necessary to discontinue the polymerization process and to remove the polymer which is present in the reactor.

It is an object of this invention to provide a process for the polymerization of ethylene in the gaseous state under the influence of a gas phase catalyst to produce a normally solid polymer and to prevent excessive accumulation of the resultant ethylene polymer in the reaction zone without interrupting the polymerization reaction. Another object of my invention is to provide apparatus for the practice of the aforesaid process. An additional object of this invention is to provide a process for the continuous gas phase polymerization of ethylene at a temperature below the softening temperature of the ethylene polymer being produced, in which process excessive accumulation of solid polymer in the polymerization reactor is prevented, without interrupting the polymerization reaction, by coating the confining interior surfaces of the polymerization zone with an aqueous liquid containing a surface active substance. These and other objects of my invention will become apparent from the ensuing description thereof.

In accordance with this invention, access of the ethylene polymer to the walls of the reactor is prevented by coating said walls with a film of water containing a surface active substance. I have observed that although water does not prevent the accumulation of ethylene polymer on the reactor walls, the addition of a surface active substance to water produces a solution or dispersion which prevents polymer adherence to the reactor walls, possibly by the mechanism of preferential adsorption of the surface active substance on the reactor walls. By this invention, the ethylene polymer is not mechanically swept from the reactor walls, but is denied access to said walls. Accordingly, the alternative necessity for providing turbulent, massive, high speed water films or streams is obviated. A thin, non-turbulent (relatively quiescent) film of water containing a surface active agent suffices to prevent adherence of the ethylene polymer to the walls of the reactor.

The term "surface active substance" is used herein in its ordinary acceptation, i. e., a material which, when added to water, materially reduces the surface tension of the water and also materially reduces the interfacial tension between water and a non-aqueous phase which, in the present case, is the reactor wall. Numerous surface active substances are known and may be employed for the purposes of the present invention, e. g., fatty acid soaps, e. g., sodium or potassium oleates or stearates; alkyl aromatic sulfonates, e. g. sodium dodecyl benzene sulfonate, diisopropyl naphthalene sulfonates, alkyl phenol sulfonates; preferentially water-soluble petroleum sulfonates; and other sulfonates such as alkyl sulfontes, sulfonated fatty esters, sulfonated fatty acid amides; surface active sulfates such as sulfated higher alcohols, e. g. sodium lauryl sulfate, sulfated fatty esters, sulfated fatty acids; quaternary ammonium halides; phosphorated alcohols, alkyl phosphoric acid soaps; fatty acid soaps of alkylolamines, and the like. I may also use such surface active substances as sodium metasilicate, trisodium phosphate, sodium hexametaphosphate, and the like.

The amount of surface active substance which it is necessary to add to the water will necessarily depend somewhat on the particular surface active substance which is to be applied and on the material constituting the reactor walls. Ordinarily I may employ between about 0.001 percent to about 2 or 3 percent by weight of the surface active substance, based on the weight of the water. It may sometimes be desirable to use a combination of different surface active substances, e. g. a mixture of an inorganic "builder" such as sodium sulfate and a surface active substance such as sodium dodecylbenzenesulfonate.

The following examples are presented in order to illustrate my invention:

Commercial cylinder ethylene was purified by treatment under pressure with molten sodium at about 150° C. to reduce its molecular oxygen content to a value below about 10 parts (by weight) per million. The reactor employed was a stainless steel bomb having a capacity of about 230 ml., into which was charged 50 ml. of a 0.1 weight percent solution of Nacconol NR solution in water. Nacconol NR is a surface active substance, being a mixture of sodium alkylbenzenesulfonates with sodium sulfate. The reaction bomb was also charged with 0.5 ml. of diethyl peroxydicarbonate catalyst, and 60 grams of the purified ethylene. In order to keep a moving film of water on the wall of the bomb during the reaction period, it was rotated about its longitudinal axis while it was immersed in a water bath at about 55° C. This was done by supporting the bomb on two horizontal rolls suspended in a frame in a constant temperature bath and rotating the bomb at a speed of 23 R. P. M. by means of a V-belt and pulley. The effectiveness of this speed of rotation for maintaining a continuous film around the inside wall of the bomb had previously been ascertained by rotating a glass tube of the same dimensions as the reaction bomb with 50 ml. of water in it. The maximum reaction pressure was approximately 3000 p. s. i. At the end of 4 hours the bomb was removed from the thermostat, allowed to come to room temperature, and the unreacted ethylene was then bled off. The product was an ethylene polymer having a softening point of 102° C. It was noted that none of the polymer stuck to the walls of the bomb, and the polymer was recovered from the center part of the bomb.

A duplicate run produced similar results. When water alone was employed in otherwise duplicating experiments, the ethylene polymer adhered to the walls of the reactor, offering a difficult job of removal.

Reference will now be made to the accompanying figure which illustrates one embodiment of the present invention. The ethylene charging stock can be prepared by a variety of methods known in the art. Thus, ethylene may be obtained from petroleum refinery gas streams, e. g. streams derived from thermal or catalytic cracking processes, from high temperature cracking of propane, by catalytic dehydrogenation of ethane, by treatment of ethane-oxygen mixtures at high temperatures, by catalytic dehydration of ethanol and the like. The ethylene stream subjected to polymerization should be substantially free of oxygen and sulfur or their compounds, and free of nitrogen compounds. I prefer to employ ethylene charging stocks containing 10 parts by weight per million of molecular oxygen or less, no sulfur or nitrogen compounds, and containing at most only small proportions of higher olefins such as propylene or butylenes, and acetylene. Molecular oxygen exerts a remarkable retardant effect upon peroxide polymerization catalysts such as peroxydicarbonate esters, such that commercial cylinder ethylene containing in the neighborhood of 0.05 weight percent of molecular oxygen is unsuitable as a feed stock for the present polymerization process. Propylene concentrations of the order of about 0.5 weight percent in the ethylene charging stock can be tolerated when the ethylene is to be polymerized to polyethylenes having a softening point above about 100° C., but it has been observed that higher concentrations of propylene, for example, about 5 percent, or more in the ethylene charging stock, markedly reduce the softening point of the polymer which is produced by the process of the present invention. Propylene and higher olefins may be selectively removed from ethylene by adsorption, polymerization, alkylation, etc.

The charging stock employed in the process of this invention may contain saturated hydrocarbons such as ethane and propane, which merely exert a diluent effect by reducing the amount of ethylene in the polymerization zone, but do not exert any poisoning effect on the polymerization reaction.

As illustrated, ethylene is passed from source 10 through a pump or compressor 11 and heater 12 into a purifier indicated schematically at 13. In zone 13, oxygen, and nitrogen and sulfur-containing materials are removed from the ethylene stream. Prior art processes for the removal of small amounts of oxygen from hydrocarbon gas streams may be employed for the purpose of deoxidizing the ethylene charging stock. By way of example the ethylene may be deoxidized after being compressed to 750 p. s. i. g. and heated to about 300° F. by passage through a column packed with grains of metallic copper. An alternative method of deoxidizing comprises contacting the ethylene, under desired pressure, with an alkali metal or an alkaline earth metal, for example, molten sodium or a sodium-potassium alloy. The oxygen content of ethylene is readily reduced below 10 parts per million by contacting it with molten sodium alloys at temperatures of about 125° C. to about 150° C. over a period of about ½ to about 12 hours. Other suitable methods of oxygen removal are described in British Patent No. 560,497. It may be desirable to remove oxygen and sulfur compounds from ethylene by different methods in separate zones.

From purifier 13, the ethylene charging stock is passed into a heat exchanger 14 wherein its temperature is brought to about the temperature which it is desired to maintain in the polymerization reactor 19. Next, the ethylene is compressed by compressor 15 to the desired polymerization pressure and passes into line 16 where it is joined by catalyst from source 17 being pumped to the reactor 19 by pump 18. If desired, the catalyst and ethylene streams may be injected separately into the reactor. Catalyst may be added to the reactor as such or as a dispersion or solution in water. Highly frangible catalysts such as peroxydicarbonate esters are best injected into the reactor as a stream separate from the ethylene stream, at a low temperature which may be 0° C. or even less.

In reactor 19, ethylene is polymerized in the gaseous phase under the influence of a homogeneous catalyst. The resultant polymer impinges on the surface of the aqueous solution or dispersion of surface active substance which carries the ethylene polymer into a sump in the lower portion of the reactor. The aqueous solution of the surface active substance can be introduced onto the walls of the polymerization reactor by a centrally located distributing line 20 which directs the solution onto a baffle 21 which, in turn, distributes the solution to the walls of the reactor. Other and equivalent means of introducing the aqueous solution, for example, weirs, tangential jets and the like will readily suggest themselves to those skilled in the art.

The reactor is provided with internal cooling coil 22, through which a heat transfer medium can be circulated to aid in controlling the temperature during the exothermic ethylene polymerization reaction.

The dispersion of ethylene polymer in the aqueous liquid in the bottom of the reactor, which dispersion may be maintained by a mechanical mixing device (not shown), leaves the reactor by line 23 which may be provided with a steam jacket 24 to prevent plugging, and passes through valve 25, whose operation is controlled by a liquid level control 26 in the sump of reactor 19. The dispersion of polyethylene then enters a separating drum 27 provided with overhead vent line 28 containing a back pressure control valve 29 and provided also with a float control 34.

Although a vertical reactor has been diagrammatically illustrated, other forms of reactor may also be employed. Thus a reactor of the type shown may be employed in an inclined position. If desired, the polymerization reactor may be rotated mechanically to aid in the distribution of the liquid along the interior walls of the reactor. If desired, manifolded tubular reactors of the type of tube-and-shell heat exchangers can be employed. It is desirable to employ reactors having a large surface:volume ratio to facilitate rapid dissipation of the heat evolved during the polymerization of the ethylene.

The reactor can be made of stainless steel, or lined with glass, aluminum and its alloys, silver, nickel, tin, etc.

In separating drum 27, pressure is released through a valve 29, so that ethylene is released from the dispersion of polyethylene in the aqueous liquid and passes through line 28 for recycle to reactor 19. A portion of the ethylene may be withdrawn from the reactor system through valved line 30. The ethylene recycle stream passes through line 31 and thence through lines 32, 33 or both for recycle to the polymerization zone. Carbon dioxide which tends to concentrate in the ethylene recycle stream because of the decomposition of catalysts such as peroxydicarbonate esters may be removed in purifying zone 13 or in a separate zone (not shown), prior to recycle of the ethylene stream to the polymerization reactor.

The level of the polyethylene dispersion in the carrier liquid in separator 27 is controlled by float control 34, which actuates valve 36 in line 35, through which the polyethylene dispersion leaves the separator. The polyethylene dispersion is then passed through a cooler 36A into a thickener or filter. In the thickener or filter, a concentrated polyethylene slurry is formed and is separated from the bulk of the aqueous liquid. The aqueous liquid leaves the thickener 37 by line 38, whence the principal part thereof is passed through valved line 39 into line 40 for recycle to the polymerization reactor. A portion of the used aqueous liquid may be diverted from the system through valved line 41. Fresh aqueous liquid may be introduced into the system from source 42 and line 43. The recycled aqueous liquid is impelled by pump 44 through a heat exchanger 45 which suitably adjusts the temperature of the liquid for use in the polymerization zone. It is ordinarily desirable to maintain the temperature of the aqueous liquid at about the polymerization temperature or even somewhat lower, to serve as an aid in controlling the exothermic polymerization reaction. From heat exchanger 45 the liquid may be passed through line 46, valve 47 and line 48 for recycle through line 20 to the reactor 19.

Since molecular oxygen is detrimental to the polymerization operation being conducted in reactor 19 it is desirable to divert part or all of the aqueous liquid stream through line 49 and valve 50 into an oxygen removal zone 51, whence the deoxygenated liquid, containing substantially no oxygen is passed by line 52 to line 48 for recycle to reactor 19. Surface active substances may be added to the water in advance of, or subsequent to, the oxygen-removal operation. Conventional methods for the removal of small quantities of oxygen (air) from water or aqueous liquids may be employed in zone 51, e. g. mechanical deaerators, chemical deaerators, or both. Condensed steam may serve as the water of the aqueous liquid.

Polyethylene slurry leaves thickener 37 through valved line 53, whence it passes into a flotator 54. In the flotator the ethylene polymer rises to the surface of the liquid and is picked up by a belt or web conveyor 55, whence it is discharged to comminuting rolls 56. Carrier liquid is withdrawn from flotator 54 through line 57 and is passed through valved line 58 for recycle to separator 27. If desired a portion of the recycle carrier liquid from the flotator may be diverted from the system through valved line 59.

The ethylene polymer passes from the comminuting rolls 56 to hopper 60 leading into dryer

61. In the dryer the ethylene polymer is conveyed by a belt or web conveyor 62, upon which it is subjected to the action of a current of drying gas, for example, hot air, introduced by line 63 and leaving the dryer by line 64. The dried ethylene polymer leaves the dryer through line 65.

Preferred catalysts for use in the practice of the gas phase polymerization of ethylene to normally solid polyethylenes are the peroxydicarbonate esters, which have the general formula

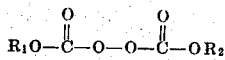

wherein R₁ and R₂ are organic radicals. These are extremely active and frangible peroxides, which possess the unusual capacity to induce ethylene polymerization at a desirable rate at temperatures below about 100° C. to yield solid polymers having softening temperatures above about 100° C. and ranging in properties from waxy to hard, horny, resinous materials, although polymers of gel-like structure having softening temperatures below 100° C. may also be produced with these catalysts. A suitable method for the preparation of these catalysts comprises suspending the desired ester of chloroformic acid,

in an aqueous or non-aqueous medium, for example, water, chloroform, pentane, etc. and treating this suspension with a peroxide, usually sodium peroxide, at a low temperature, e. g., 0° C. Suitable methods for the preparation of dialkyl peroxydicarbonates have been described by Wieland et al., Annalen 446, 31—48 (1926). However, I do not limit myself to the Wieland methods of preparing peroxydicarbonates, and other methods can be used for the purpose of this invention. Crude peroxydicarbonates can be used, but it is preferable to employ a purified peroxide such as may be obtained by selective extraction of the crude peroxide. Also, purification may be accomplished by selective extraction of impurities from the peroxydicarbonate ester.

In the general formula

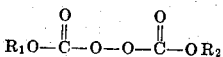

the organic radicals R₁ and R₂ can be the same or different and may, for example, by alkyl radicals such as methyl, ethyl, propyl, butyl, amyl; radicals containing an aromatic nucleus, e. g., benzyl, phenyl, tolyl; cycloparaffinic radicals such as cyclopentyl, methylcyclopentyl, cyclohexyl; unsaturated radicals, such as vinyl, allyl, propenyl; or their substitution derivatives, or the like. I may also use peroxydicarbonate esters wherein R₁ and R₂ make up a divalent radical. I may also employ polymeric peroxides, e. g., of the type which can be produced by the reaction between sodium peroxide and ethylene glycol bis (chloroformate).

It should not be inferred that all the peroxydicarbonate esters have precisely equivalent capacity for catalyzing the polymerization of ethylene to form normally solid polymers, although no significant decrease in catalytic activity has been observed as the alkyl group in symmetrical dialkyl peroxydicarbonate ester catalysts was changed from methyl to ethyl, propyl, butyl and amyl.

Peroxydicarbonate esters are generally thermally unstable and exhibit a high temperature coefficient of decomposition. A number of the peroxides, e. g. dimethyl, diethyl and dipropyl peroxydicarbonates, are characterized by being 10% decomposed in one second at a first temperature and at least 90% decomposed in one second at another temperature which is less than 35° C. higher than said first temperature. Diethyl peroxydicarbonate decomposes completely and substantially instantaneously at about 35° C. At higher temperatures diethyl peroxydicarbonate decomposes with explosive violence. Nonetheless, I can employ diethyl peroxydicarbonate as a polymerization catalyst for the preparation of solid polymers from ethylene at temperatures above its decomposition temperature, e. g., 55° C. or 65° C. It appears that the thermal stability of peroxydicarbonate ester catalysts is increased by the presence of unsaturated organic compounds or their polymers. Peroxides other than peroxydicarbonate esters may be useful as polymerization catalysts provided that at temperatures within the polymerization temperature range they exhibit the pronounced temperature coefficient of decomposition which characterizes the peroxydicarbonate esters.

Although the peroxydicarbonate esters are the preferred catalysts for the operation of the polymerization process of this invention, the use of other catalysts, alone or together with the peroxydicarbonate esters is not excluded. For example, tert., butylhydroperoxide may be employed as a catalyst or co-catalyst with peroxydicarbonate esters, particularly the dialkyl esters.

Normally between about 0.01% and about 10% by weight of peroxide based on the weight of olefin to be polymerized is employed, although some departure from this range may be necessary in certain instances. It is preferable that the actual oxygen content of the peroxide which is employed fall within the range of 80 to 100% of the theoretical oxygen content of said peroxide. Some of the peroxydicarbonate esters, for example diethyl peroxydicarbonate, decompose on standing and the aged catalysts are not as active polymerization catalysts as freshly made preparations. Generally, an increase in the proportion of catalyst to feed stock increases the rate of polymerization, other reaction conditions remaining the same. However, excessive amounts of catalyst may result in the production of polymers of lower molecular weight than might otherwise be obtained.

The gas phase polymerization of ethylene with peroxydicarbonate esters may be conducted at temperatures between about 0° C. and about 100° C. At temperatures below about 0° C. the rate of ethylene polymerization is so slow as to be commercially unattractive; at temperatures which, depending on the specific catalyst employed, may vary from about 75° C. to about 100° C., the yield and degree of polymerization of polymer are markedly reduced. A preferred polymerization temperature range to produce polyethylenes having softening temperatures of at least about 100° C. lies between about 35° C. and about 65° C. especially where peroxydicarbonate ester catalysts, for example diethyl peroxydicarbonate, are employed.

The polymerization pressure, by which is meant the partial pressure of ethylene in the polymerization zone, may vary between about 500 and about 10,000 p. s. i. g. or even more. Homogeneous gas phase polymerization of ethylene with catalysts such as peroxydicarbonate esters is best effected at pressures above about 4,000 p. s. i. g. and preferably not in excess of about 10,000 p. s. i. g. At polymerization pressures up to about 5,000 p. s. i. g. the rate of ethylene polymerization increases with increasing pressure. However, above about 5,000 p. s. i. g. the rate of ethylene polymerization does not appear to increased markedly with pressure, although the softening temperatures of the ethylene polymers continue to increase, with the result that at pressures of about 8,000 p. s. i. g. it has been possible to produce polyethylenes having softening temperatures above about 200° C.

Depending upon the other reaction variables and upon the nature of the product desired, the polymerization period may vary from below about 1 hour to about 50 hours or even more, e. g., 100 hours. Ordinarily polymerization periods of between about 1 and about 5 hours are satisfactory.

The polyethylenes produced by the process of this invention can be subjected to such aftertreatment as may be desired, to fit them for particular uses or to impart desired properties. Thus, the flexibility of the polyethylenes can be improved by subjecting them to mechanical milling. Antioxidants, fillers, extenders, plasticizers, pigments, etc. can be incorporated in the polyethylenes.

Although the process of my invention will probably find its widest application in processes for the continuous polymerization of ethylene, it is not limited in its usefulness to continuous processes. Thus, the intermittent or continuous use of aqueous dispersions or solutions of surface active substances may be desirable in effecting the polymerization of ethylene in large batch reactors.

Having thus described by invention, what I claim is:

1. A continuous process which comprises subjecting a gas stream comprising ethylene and a peroxide catalyst to polymerization conditions of temperature and pressure in a polymerization zone to polymerize said ethylene in the gaseous state to form a normally solid polymer, maintaining a moving liquid film consisting of an aqueous solution of a surface active substance only upon the confining interior surfaces of said polymerization zone without substantial agitation of said gas stream into said aqueous solution, and removing said polymer from said polymerization zone as a suspension in said aqueous solution.

2. The process of claim 1 wherein the peroxide catalyst is a di-peroxydicarbonate ester.

3. The process of claim 1 wherein the peroxide catalyst is a hydrocarbon peroxydicarbonate ester having the formula

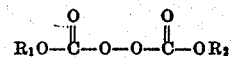

wherein $R_1$ and $R_2$ are hydrocarbon radicals.

4. The process of claim 1 wherein the peroxide catalyst is an alkyl peroxydicarbonate ester having the formula

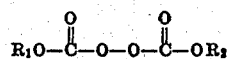

wherein $R_1$ and $R_2$ are alkyl radicals.

5. A continuous process which comprises subjecting a gas stream comprising ethylene and a peroxide catalyst having the general formula

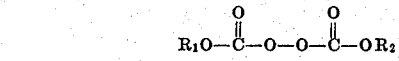

wherein $R_1$ and $R_2$ are hydrocarbon radicals to a polymerization temperature between about 0° C. and about 100° C. and a pressure between about 500 and about 10,000 p. s. i. g. in a polymerization zone to form a normally solid polymer, maintaining a moving liquid film consisting of an aqueous solution of a surface active substance only upon the confining interior surfaces of said polymerization zone without substantial agitation of said gas stream into said aqueous solution, and removing said polymer from said polymerization zone as a suspension in said aqueous solution.

6. The process of claim 5 where $R_1$ and $R_2$ are alkyl radicals, the polymerization temperature is between about 35° C. and about 65° C. and the polymerization pressure is between about 4000 and about 10,000 p. s. i. g.

7. The process of claim 5 where the surface active agent is an alkyl aromatic sulfonate.

8. The process of claim 5 wherein the catalyst is diethylperoxydicarbonate.

9. The process of claim 5 wherein $R_1$ and $R_2$ are alkyl radicals, the polymerization temperature is between about 35° C. and about 65° C., the polymerization pressure is between about 4000 and about 10,000 p. s. i. g. and the surface active agent is an alkyl aromatic sulfonate.

10. A process which comprises subjecting a gas comprising ethylene and a peroxide catalyst to polymerization conditions of temperature and pressure in a polymerization zone to polymerize said ethylene in the gaseous state to form a normally solid polymer, maintaining a moving liquid film consisting of an aqueous solution of a surface active substance only upon the confining interior surfaces of said polymerization zone without substantial agitation of said gas into said aqueous solution, and removing said polymer from said polymerization zone as a suspension in said aqueous solution.

ELLSWORTH E. McSWEENEY.

REFERENCES CITED

The following references are of record in the file of this patent:

UNITED STATES PATENTS

| Number | Name | Date |
|---|---|---|
| 2,370,588 | Strain | Feb. 27, 1945 |
| 2,394,960 | Young | Feb. 12, 1946 |
| 2,395,327 | Hanford | Feb. 19, 1946 |
| 2,396,677 | Brubaker | Mar. 19, 1946 |
| 2,397,260 | Hanford et al. | Mar. 26, 1946 |

OTHER REFERENCES

Hopff et al. Modern Plastics, entire article: pp. 153–160, 206, 208, 210, 212, 214, 216, 218 and 220, June 1946.